(12) United States Patent
Shibata

(10) Patent No.: US 11,008,119 B2
(45) Date of Patent: May 18, 2021

(54) AIRCRAFT PLATFORM

(71) Applicant: YAMAHA HATSUDOKI KABUSHIKI KAISHA, Shizuoka (JP)

(72) Inventor: Hideki Shibata, Irvine, CA (US)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 364 days.

(21) Appl. No.: 15/916,875

(22) Filed: Mar. 9, 2018

(65) Prior Publication Data
US 2019/0276162 A1    Sep. 12, 2019

(51) Int. Cl.
*B64F 1/00* (2006.01)
*B64C 39/02* (2006.01)

(52) U.S. Cl.
CPC ............. *B64F 1/007* (2013.01); *B64C 39/024* (2013.01); *B64C 2201/024* (2013.01); *B64C 2201/18* (2013.01); *B64C 2201/208* (2013.01)

(58) Field of Classification Search
CPC ........ B64F 1/007; B54F 1/0297; B54F 1/125; B64C 2201/208
See application file for complete search history.

(56) References Cited

U.S. PATENT DOCUMENTS

| | | | | |
|---|---|---|---|---|
| 7,152,547 B1* | 12/2006 | Hovland | ................ | B63B 17/00 114/261 |
| 2005/0230537 A1* | 10/2005 | Chouery | ................ | B63B 17/00 244/116 |
| 2009/0236470 A1* | 9/2009 | Goossen | ............... | B64C 39/024 244/115 |
| 2010/0224118 A1* | 9/2010 | Hovland | ................ | B64F 1/007 114/261 |
| 2011/0315810 A1* | 12/2011 | Petrov | .................. | B64C 39/022 244/17.23 |
| 2014/0070052 A1* | 3/2014 | Kang | ...................... | B64F 1/007 244/114 R |
| 2014/0124621 A1* | 5/2014 | Godzdanker | .......... | B64F 1/125 244/110 E |
| 2017/0038779 A1* | 2/2017 | Fujimori | ................ | G05D 1/101 |
| 2017/0137150 A1* | 5/2017 | Conyers | ................. | B64F 1/007 |
| 2018/0101173 A1* | 4/2018 | Banerjee | .............. | G05D 1/0684 |
| 2019/0031346 A1* | 1/2019 | Yong | ..................... | B64C 39/024 |
| 2019/0106224 A1* | 4/2019 | Nishikawa | ............ | B64D 47/08 |

FOREIGN PATENT DOCUMENTS

JP            09-302628 A    11/1997

* cited by examiner

*Primary Examiner* — Richard R. Green
*Assistant Examiner* — William L Gmoser
(74) *Attorney, Agent, or Firm* — Global IP Counselors, LLP

(57) ABSTRACT

An aircraft platform includes a base, a landing pad, a level sensor, and at least one actuator. The landing pad is supported on the base. The level sensor is configured to detect an inclination angle of at least one of the landing pad and the base with respect to a level ground. The at least one actuator is connected to change an inclination of the landing pad.

12 Claims, 6 Drawing Sheets

AIRCRAFT PLATFORM

BACKGROUND

Field of the Invention

The present invention generally relates to an aircraft platform. More specifically, the present invention relates to an aircraft platform for unmanned aerial vehicles.

Background Information

Recently, with the rapid development of unmanned aerial vehicle technology, unmanned aerial vehicles have been used for a wide range of industrial application, such as agricultural uses including spraying, seeding and the like.

For the agricultural uses, unmanned aerial vehicles need to land on the ground for refueling or for refilling agricultural materials after a certain flight time has elapsed. However, when the unmanned aerial vehicles directly land on the ground, the unmanned aerial vehicles can be exposed to the dust and debris, which might damage critical components of the unmanned aerial vehicles.

In the field of manned helicopters, platform trucks are utilized for ferrying the helicopter to the field. The platform trucks has landing pads on which the helicopter can land. With this platform truck, the operators can refuel the helicopter and refill the agricultural materials while the helicopter is located on the landing pads. Since the landing pad is elevated relative to the ground, the platform trucks allow the helicopter to remain above the dust and debris, which reduces potential wear and tear on critical components of the helicopter.

SUMMARY

Unmanned aerial vehicles are sometimes used for the agricultural uses over an undulating or uneven fields, such as a vineyard. However, it has been discovered that if the platform trucks are used in such uneven fields, then the landing pads of the platform trucks are also inclined, which is undesirable for takeoffs and landings of the unmanned aerial vehicles.

Generally, the present disclosure is directed to various features of an aircraft platform for unmanned aerial vehicles.

In accordance with one aspect of the present disclosure, an aircraft platform includes a base, a landing pad, a level sensor and at least one actuator. The landing pad is supported on the base. The level sensor is configured to detect an inclination angle of at least one of the landing pad and the base with respect to a level ground. The at least one actuator is connected to change an inclination of the landing pad.

Also, other features, aspects and advantages of the disclosed aircraft platform Will become apparent to those skilled in the field of aircraft platforms from the following detailed description, which, taken in conjunction with the annexed drawings, discloses several illustrative embodiments of an aircraft platform with various features.

BRIEF DESCRIPTION OF THE DRAWINGS

Referring now to the attached drawings which form a part of this original disclosure.

Figure 1:
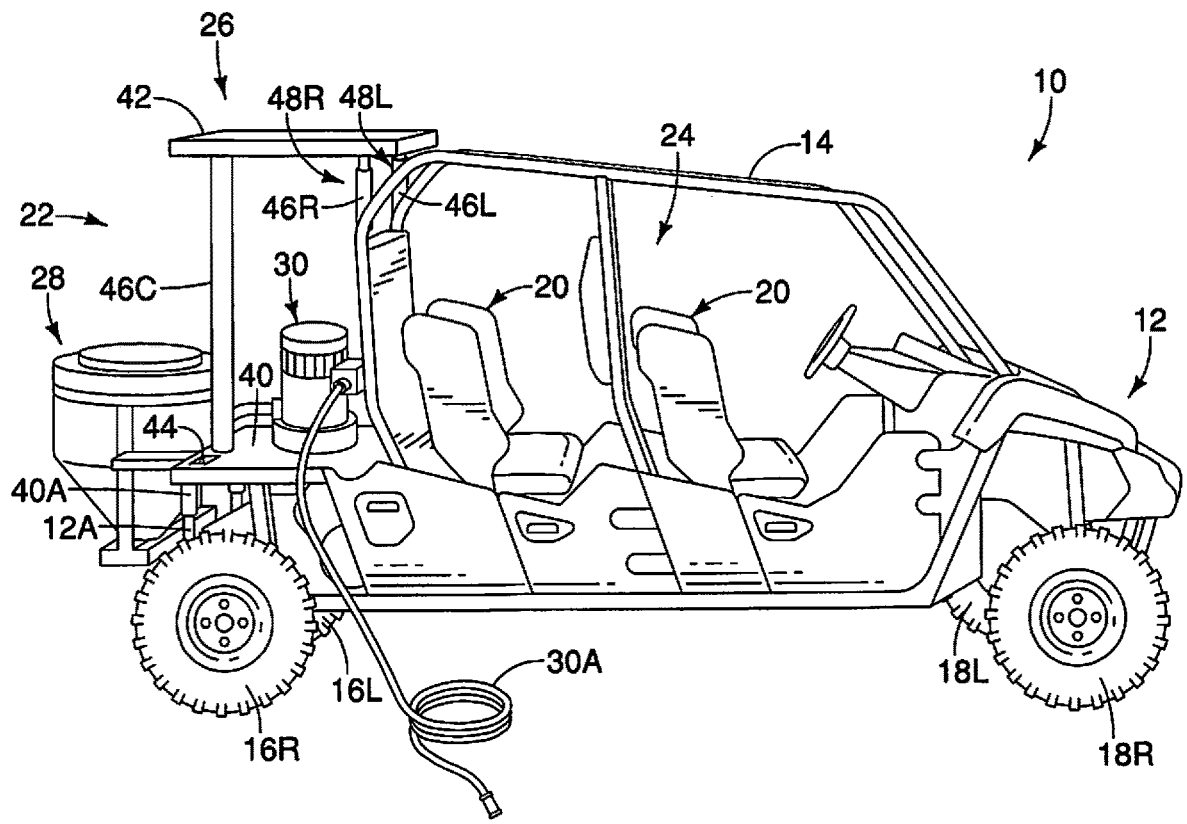
FIG. 1 is a right side view of a utility task vehicle with an aircraft platform in accordance with one embodiment.

It should be noted that these figures are intended to illustrate the general characteristics of methods, structure and/or materials utilized in certain illustrative embodiments and to supplement the written description provided below. These drawings are not, however, to scale and may not precisely reflect the precise structural or performance characteristics of any given embodiment, and should not be interpreted as defining or limiting the range of values or properties encompassed by illustrative embodiments. The use of similar or identical reference numbers in the various drawings is intended to indicate the presence of a similar or identical element or feature.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents. Like reference numerals in the drawings denote like similar or identical elements or features, and thus the descriptions of the similar or identical elements or features may be omitted in later embodiments.

Referring initially to FIG. 1, a utility task vehicle or side-by-side vehicle 10 (e.g., a vehicle) is illustrated in accordance with one embodiment. In the illustrated embodiment, for example, the utility task vehicle 10 is a small 2- to 6-person four-wheel drive off-road vehicle. In the illustrated embodiment, the utility task vehicle 10 basically includes a vehicle body 12 with a roll cage 14, a pair of rear wheels 16R and 16L, a pair of front wheels 18R and 18L and a plurality of seats 20. The utility task vehicle 10 further includes many other conventional vehicle components, such as an engine, a transmission, a steering wheel, an accelerator pedal, a brake system, etc. that are typically provided on utility task vehicles. However, for the sake of brevity, only those vehicle components needed to understand the present invention will be illustrated and/or discussed herein.

In the following description, the terms "front" and "forward" refer to a direction in which the driver looks straight when seated on a driver seat of the seats 20. Also in the following description, the terms "rear," "rearward" and "backward" refer to a direction opposite to the front or forward direction.

As illustrated in FIG. 1, the utility task vehicle 10 has an open cargo area 22 at the rear of the utility task vehicle 10 behind a cabin 24 that is defined by the roll cage 14. The utility task vehicle 10 also has an aircraft platform 26, a refilling tank 28 and a refilling pump 30 in the open cargo area 22.

As illustrated in FIG. 1, the aircraft platform 26 includes a base 40, a landing pad 42, an accelerometer 44 (e.g., level sensor) and three support legs 46R, 46L and 46C (e.g., at least three support legs). The aircraft platform 26 also includes a pair of (a plurality of) linear actuators 48R and 48L (e.g., at least one actuator) at the support legs 46R and 46L, respectively.

Specifically, the base 40 includes a flat panel that forms a bottom of the open cargo area 22. The base 40 has a pair of sockets 40A (e.g., vehicle adapters) on a lower surface of the base 40 at right and left rear corners of the base 40. The sockets 40A receive a pair of posts 12A (e.g., base adapters) of the vehicle body 12, respectively. Specifically, the posts 12A of the vehicle body 12 are fixedly coupled to the sockets 40A. With this configuration, the aircraft platform 26 is securely mounted to the utility task vehicle 10. In the illustrated embodiment, the sockets 40A is an example of the vehicle adapters that secure the aircraft platform 26 to the utility task vehicle 10, while the posts 12A is an example of the base adapters that receive the base 40. However, the base 40 can be fixedly coupled to the vehicle body 12 in a different manner typically used for coupling components of the utility task vehicles.

The landing pad 42 also includes a flat panel that forms a top of the open cargo area 22. In particular, in the illustrated embodiment, the landing pad 42 is located even or above the top of the roll cage 14. In the illustrated embodiment, the landing pad 42 is movably supported on the base 40. Specifically, the landing pad 42 is supported by the support legs 46R, 46L and 46C relative to the base 40. In the illustrated embodiment, two support legs 46R and 46L (front right and left support legs) are disposed at a front portion of the base 40, while one support leg 46C (rear center support leg) are disposed at a rear portion of the base 40. Specifically, in the illustrated embodiment, the right and left support legs 46R and 46L vertically extend from right and left rear vertical sections of the roll cage 14, respectively. On the other hand, the center support leg 46C vertically extends from the top surface of the base 40 at a rear center of the base 40. In the illustrated embodiment, the right and left support legs 46R and 46L are adjustable in height with the linear actuators 48R and 48L, while the center support leg 46C are non-adjustable in height. Specifically, upper ends of the support legs 46R, 46L and 46C are pivotally coupled to the landing pad 42 with ball joints or ball-and-socket joints, respectively, at joint locations L1, L2 and L3, respectively (see FIG. 5). Of course, the support legs 46R, 46L and 46C can be coupled to the landing pad 42 with any other type of conventional joints that allow movement of the landing pad 42 relative to the support legs 46R, 46L and 46C.

Figure 2:
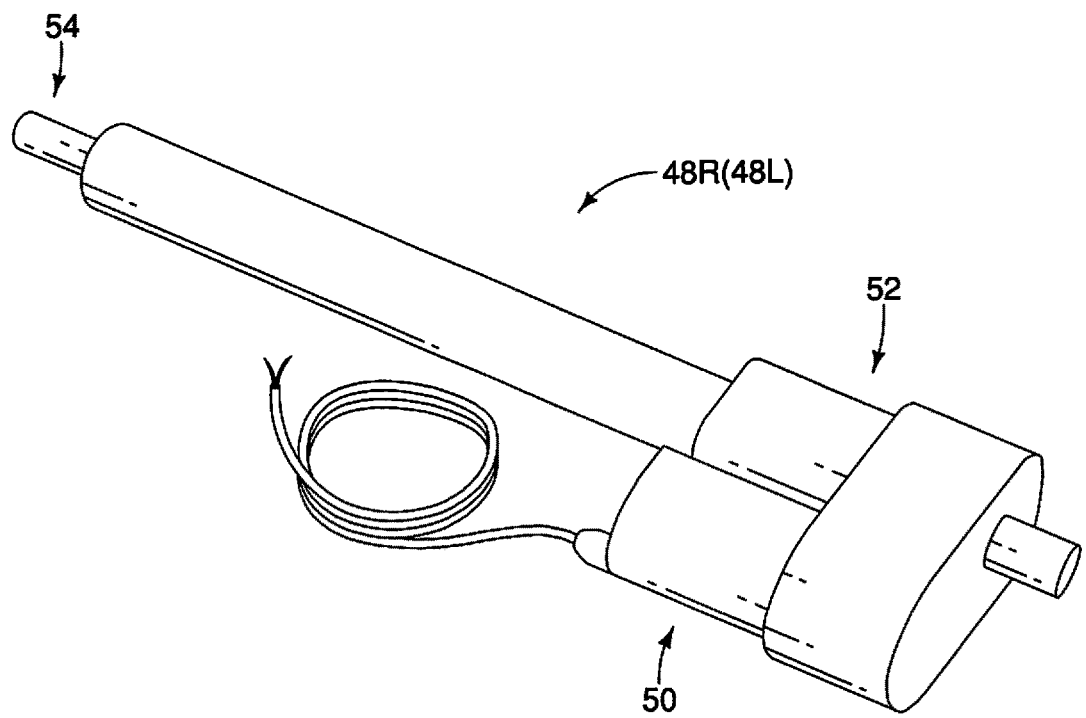
FIG. 2 is a perspective view of a linear actuator of the aircraft platform illustrated in FIG. 1.

As shown in FIG. 2, the linear actuators 48R and 48L each have an electric motor 50, a gear mechanism 52 and a sliding rod 54. The gear mechanism 52 is operatively coupled between the electric motor 50 and the sliding rod 54, and converts the rotation of the electric motor 50 into the sliding movement of the sliding rod 54. In the illustrated embodiment, the linear actuators 48R and 48L are connected to change the inclination of the landing pad 42. Specifically, the distal ends of the sliding rods 54 of the linear actuators 48R and 48L are connected to the landing pad 42 to change the inclination of the landing pad 42 by the sliding movement of the sliding rods 54. In the illustrated embodiment, the distal ends of the sliding rods 54 of the linear actuators 48R and 48L form the upper ends of the support legs 46R and 46L, respectively. The linear actuators 48R and 48L have a relatively conventional configuration, and thus will not be described in detail. Of course, the linear actuators 48R and 48L are not limited to this configuration, and can be any other type of conventional linear actuators, such as hydraulic or pneumatic actuators.

Figure 3A:
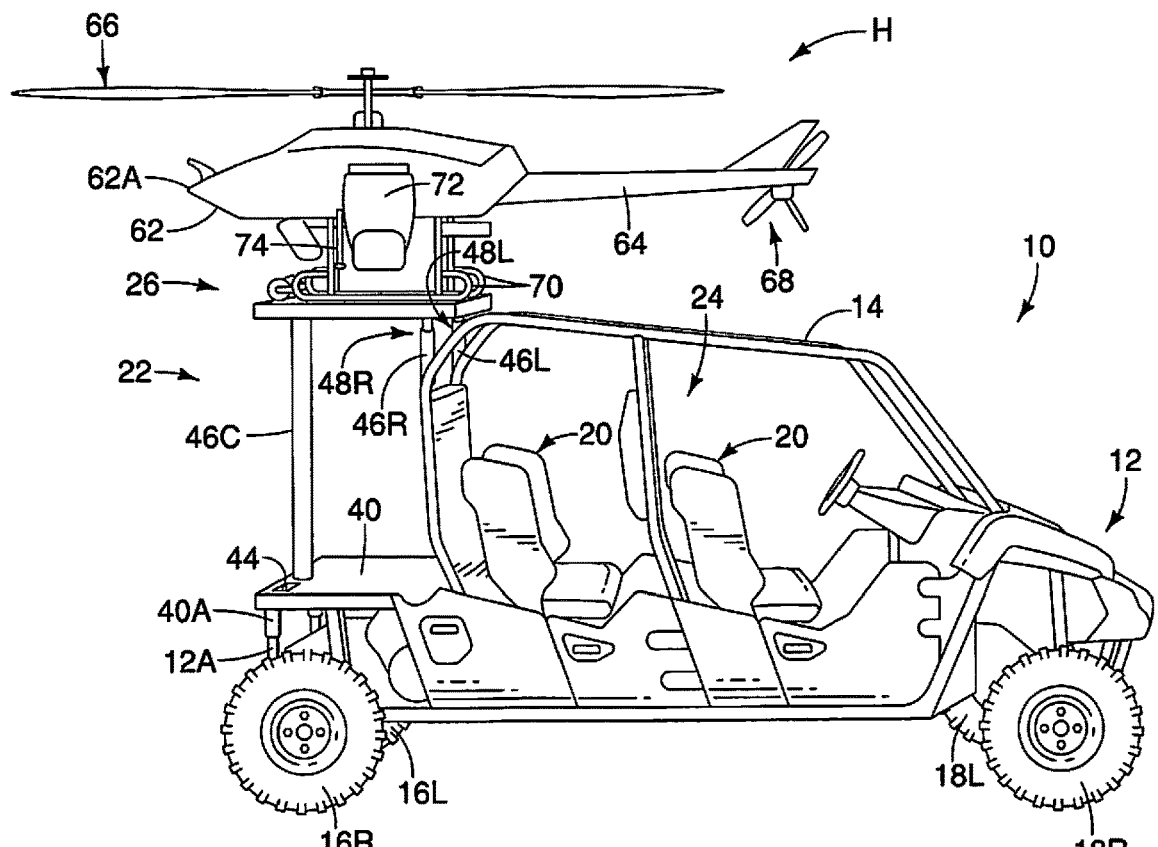
FIG. 3A is a right side view of the utility task vehicle illustrated in FIG. 1, in which an unmanned helicopter is located on a landing pad of the aircraft platform with a nose of the unmanned helicopter pointing a rear direction of the utility task vehicle and a refilling tank and a refilling pump removed from the utility task vehicle.
Figure 3B:
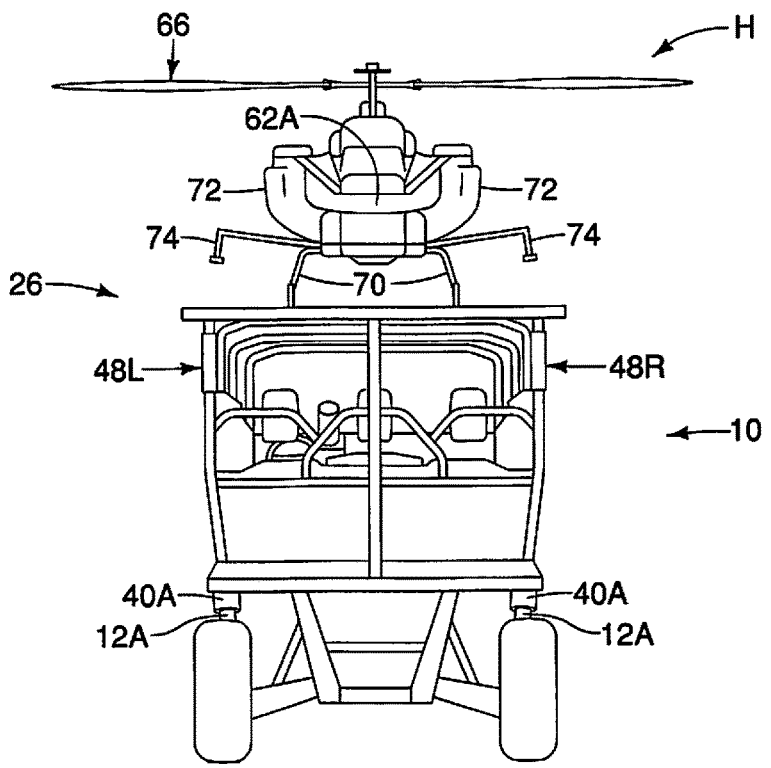
FIG. 3B is a rear view of the utility task vehicle and a front elevational view of the unmanned helicopter illustrated in FIG. 3A.

With this configuration, as shown in FIGS. 3A, 3B, 4A and 4B, the aircraft platform 26 of the utility task vehicle 10 is utilized as a platform for takeoffs and landings of an unmanned helicopter H (e.g., an aircraft). As shown in FIGS. 3A and 3B, the unmanned helicopter H includes a main body 62 and a tail body 64. The tail body 64 is coupled to a rear end of the main body 62. The unmanned helicopter H also includes a main rotor 66 rotatably provided at an upper part of the main body 62 and a tail rotor 68 rotatably provided at a rear part of the tail body 64. In the illustrated embodiment, the unmanned helicopter H is a rotorcraft with a single main rotor. However, the unmanned helicopter H can be a rotorcraft with at least two main rotors, such as a multicopter.

Furthermore, the unmanned helicopter H has a pair of skids 70 provided via support legs at the left and right sides of the main body 12. Also, in the illustrated embodiment, the unmanned helicopter H has a pair of liquid tanks 72 and a pair of spray nozzles 74 fluidly connected to the liquid tanks 72. The liquid tanks 72 holds the agricultural material, such as chemicals, fertilizers and the like, for crops. The spray nozzles 74 spray the agricultural material. Of course, instead of the liquid tanks 72 and the spray nozzles 74, the unmanned helicopter H can have other equipment for agricultural application, such as a granular spreader, or other equipment for industrial application, such as various sensors and detectors.

The unmanned helicopter H also has conventional physical configurations. Specifically, the unmanned helicopter H has an internal combustion engine, an intake system, an exhaust system and a fuel tank within the man body 62. Of course, instead of the engine, the unmanned helicopter H can have another type of a prime mover, such as an electric motor. Also, the unmanned helicopter H has a plurality of (five, for example) servos, with three of them connected to a swashplate via linkages to change the pitch (angle) of main blades of the main rotor 66 (i.e., an aileron servo, an elevator servo and a pitch servo), one of them connected to tail blades of the tail rotor 68 via a linkage to change the pitch (angle) of the tail blades of the tail rotor 68 (i.e., a rudder servo) and one of them connected to the engine via a linkage to control the throttle of the engine (i.e., a throttle servo). These physical configurations of the unmanned helicopter H are relatively conventional, and thus will not be described in detail for the sake of brevity.

Referring to FIG. 1, in the illustrated embodiment, the refilling tank 28 of the utility task vehicle 10 holds the agricultural material, such as chemicals, fertilizers and the like, for crops, that is to be refilled in the liquid tanks 72 of the unmanned helicopter H. Specifically, the refilling tank 28 is fluidly connected to the liquid tanks 72 of the unmanned helicopter H for refilling the agricultural material while the unmanned helicopter H is located on the aircraft platform 26 of the utility task vehicle 10. In particular, the refilling tank 28 is fluidly connected to the liquid tanks 72 of the unmanned helicopter H through the refilling pump 30 and a refilling hose 30A that extends from the refilling pump 30. In the illustrated embodiment, the refilling pump 30 includes an electrically powered pump for pumping the agricultural material from the refilling tank 28 to the liquid tanks 72 of the unmanned helicopter H. With this configuration, the utility task vehicle 10 can provide a closed chemical loading system for refilling the liquid tanks 72 of the unmanned helicopter H with minimal chemical exposure for operators. In the illustrated embodiment, the refilling tank 28 holds the agricultural material to be refilled in the liquid tanks 72 of the unmanned helicopter H. Of course, the refilling tank 28 can holds other material to be supplied to the unmanned helicopter H, such as fuel for the engine of the unmanned helicopter H.

Figure 4A:
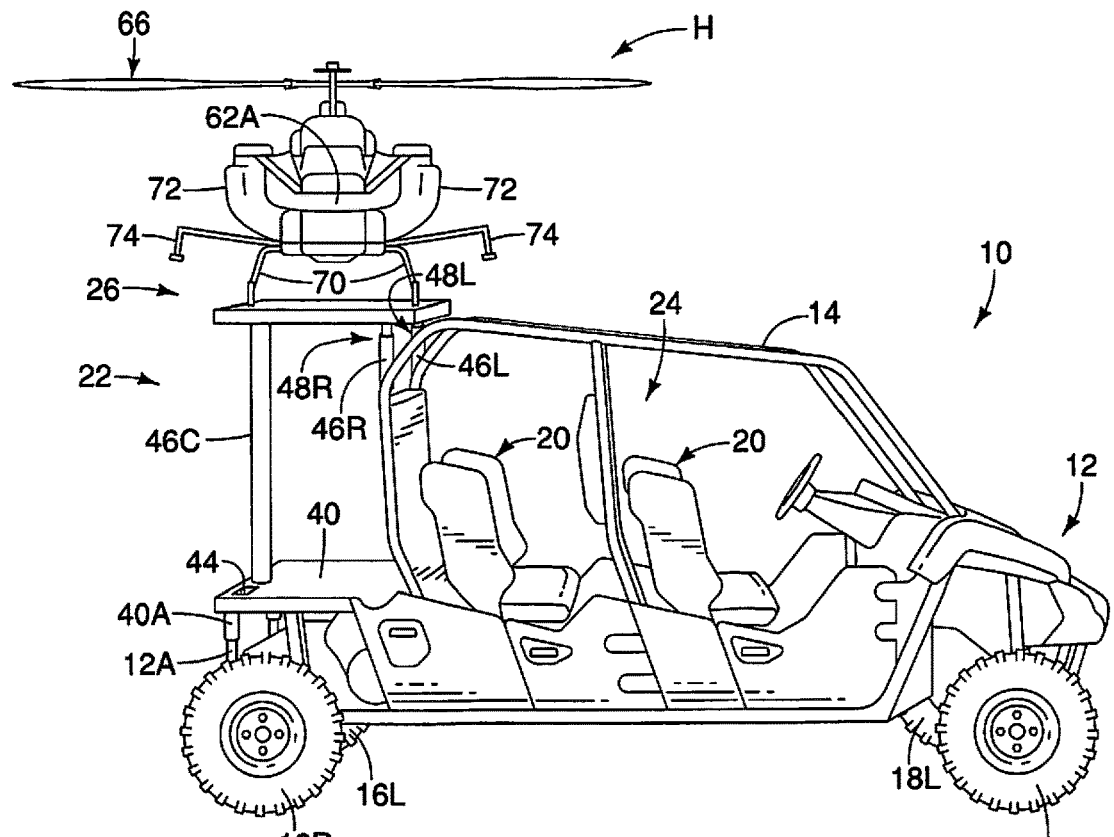
FIG. 4A is a right side view of the utility task vehicle illustrated in FIG. 1, in which the unmanned helicopter is located on the landing pad of the aircraft platform while the nose of the unmanned helicopter pointing a right direction of the utility task vehicle and the refilling tank and the refilling pump removed from the utility task vehicle.
Figure 4B:
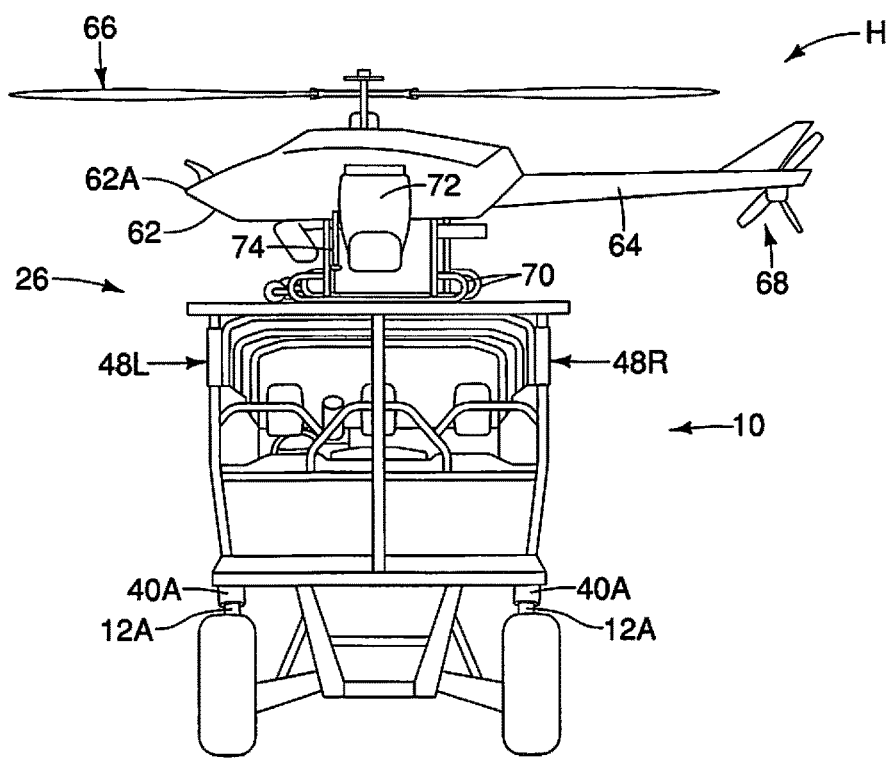
FIG. 4B is a rear view of the utility task vehicle and a side elevational view of the utility task vehicle illustrated in FIG. 4A, with the nose of the unmanned helicopter pointing a left direction of the utility task vehicle and the refilling tank and the refilling pump being removed from the utility task vehicle.

In the illustrated embodiment, as shown in FIGS. 3A, 3B, 4A and 4B, the unmanned helicopter H can be located on the aircraft platform 26 of the utility task vehicle 10 while facing in any direction with respect to the utility task vehicle 10. Specifically, as shown in FIGS. 3A and 3B, the unmanned helicopter H can be located on the aircraft platform 26 of the utility task vehicle 10 while a nose 62A of the unmanned helicopter H points the rear direction of the utility task vehicle 10. Also, as shown in FIG. 4A, the unmanned helicopter H can be located on the aircraft platform 26 of the utility task vehicle 10 while the nose 62A of the unmanned helicopter H points the right direction of the utility task vehicle 10. Also, as shown in FIG. 4B, the unmanned helicopter H can be located on the aircraft platform 26 of the utility task vehicle 10 while the nose 62A of the unmanned helicopter H points the left direction of the utility task vehicle 10.

Figure 5:
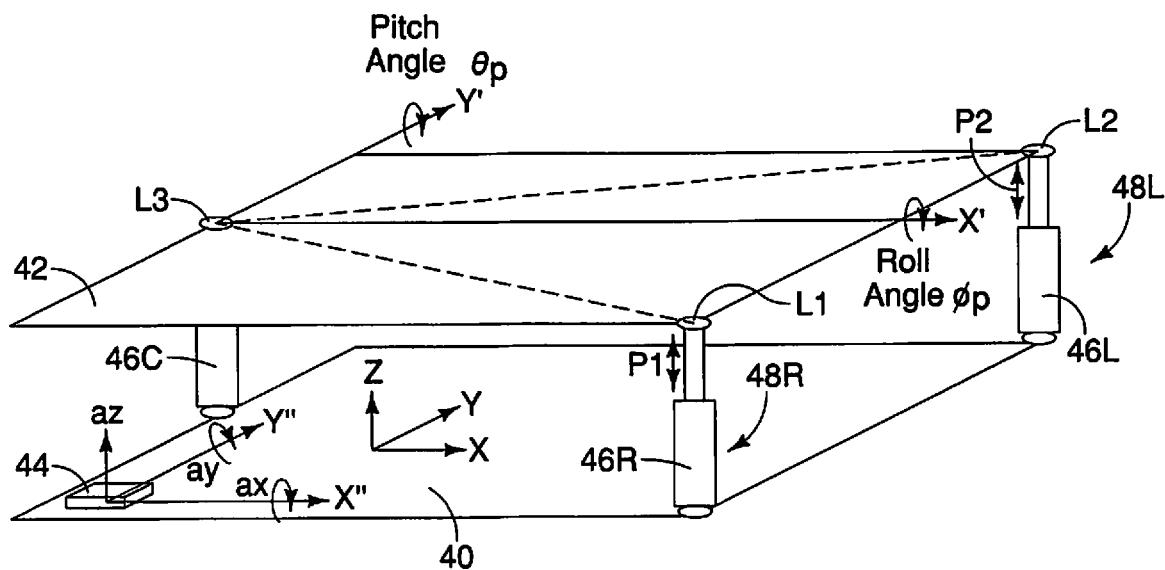
FIG. 5 is a schematic diagram of the aircraft platform illustrated in FIG. 1.

Referring now to FIG. 5, the aircraft platform 26 of the utility task vehicle 10 will be described in detail. In the illustrated embodiment, the accelerometer 44 is fixedly mounted to the top surface (mount surface) of the base 40. The accelerometer 44 includes a three-axis accelerometer that detects accelerations along XYZ axes (i.e., accelerations ax, ay and az) on the base 40. Specifically, in the illustrated embodiment, the X axis is parallel to the longitudinal center line of the utility task vehicle 10 on the top surface of the base 40, the Y axis extends laterally perpendicular to the X axis on the top surface of the base 40, and the Z axis extends perpendicular to the XY axes. Thus, in the illustrated embodiment, the accelerometer 44 outputs the accelerations along the XYZ axes to the controller 82, which can be converted to the inclination angles of the base 40 relative to a level ground or horizontal plane. Thus, in the illustrated embodiment, the accelerometer 44 detects the inclination angles of the base 40 relative to the level ground.

As mentioned above, the landing pad 42 can be inclined with respect to the base 40 by adjusting the lengths of the right and left support legs 46R and 46L. Specifically, in the illustrated embodiment, the landing pad 42 is movable about the joint location L3 to change the inclination of the landing pad 42 relative to the base 40 and the level ground. Specifically, when one of the right and left support legs 46R and 46L is extended and the other one is contracted, then a roll angle of the landing pad 42 relative to the base 40 is changed. On the other hand, when the right and left support legs 46R and 46L are both extended or contracted, then a pitch angle relative to the base 40 is changed. In the illustrated embodiment, the roll angle of the landing pad 42 relative to the base 40 is an inclination (rotation) angle of the landing pad 42 about an X' axis that extends through the joint location L3 and is parallel to the X axis on the base 40. Also, the pitch angle of the landing pad 42 relative to the base 40 is an inclination (rotation) angle of the landing pad about a Y' axis that extends through the joint location L3 and is parallel to the Y axis on the base 40.

Figure 6:
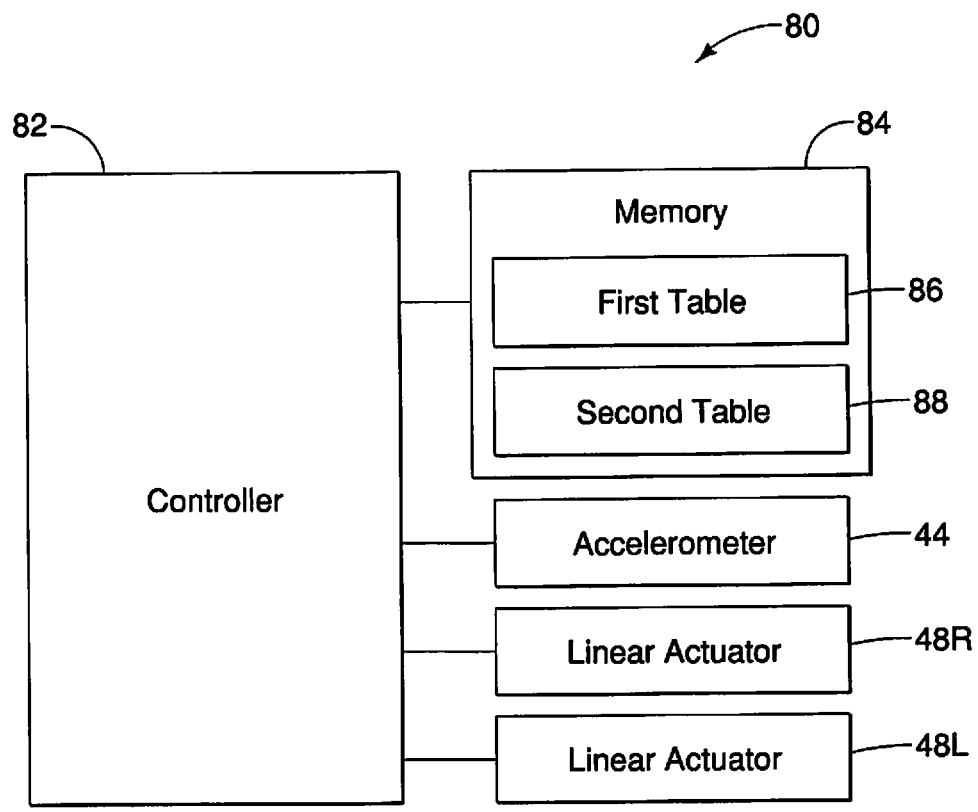
FIG. 6 is a block diagram of an aircraft platform control system of the aircraft platform illustrated in FIG. 1.

In the illustrated embodiment, as shown in FIG. 6, the utility task vehicle 10 further has an aircraft platform control system 80 for controlling the aircraft platform 26. Specifically, the aircraft platform control system 80 includes a controller 82 (e.g., an electronic controller), a memory 84 (e.g., a computer memory), the accelerometer 44, the linear actuators 48R and 48L.

As understood in the art, the controller 82 includes a microcomputer having one or more processors that execute one or more control programs for controlling the aircraft platform 26. The controller 82 can also include other conventional components such as an input interface circuit, an output interface circuit, and data/program storage devices such as a ROM (Read Only Memory) device and a RAM (Random Access Memory) device. The RAM and ROM store processing results and control programs that are run by the processor(s) of the controller 82. The controller 82 is operatively coupled to the components of the aircraft platform 26 as appropriate, in a conventional manner. It will be apparent to those skilled in the art from this disclosure that the precise structure and algorithms for the controller 82 can be any combination of hardware and software that will carry out the functions of the present invention. Also, as understood in the art, the memory 84 is any computer storage device or any computer readable medium with the sole exception of a transitory, propagating signal. For example, the memory 84 can be nonvolatile memory and volatile memory, and can includes an internal memory, or other type of memory devices such as flash memory or hard drives with external high-speed interface such as a USB bus or an SATA bus.

As illustrated in FIG. 6, the controller 82 is electrically connected to the memory 84, the accelerometer 44 and the liner actuators 48R and 48L to control the linear actuators 48R and 48L based on the output of the accelerometer 44.

Figure 7:
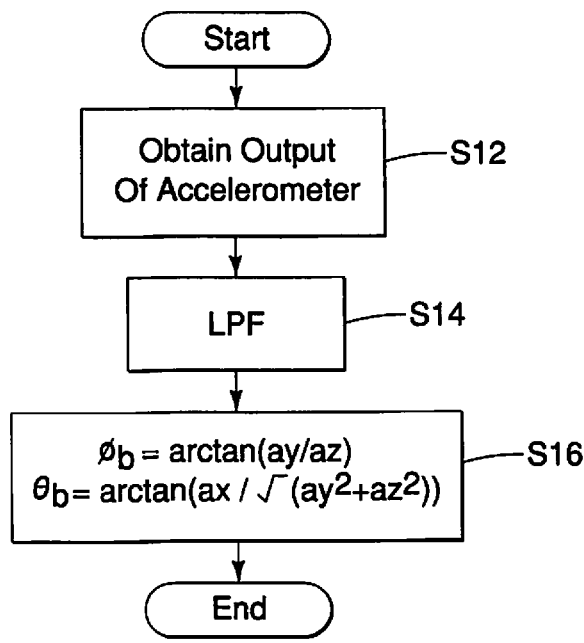
FIG. 7 is a flowchart for detecting an inclination angle of a base of the aircraft platform illustrated in FIG. 1.

Specifically, as illustrated in FIG. 7, the controller 82 first calculates the inclination angle of the base 40 relative to the level ground. Specifically, the controller 82 obtains the output of the accelerometer 44 while the utility task vehicle 10 is in a stationary state relative to the ground (step S12). The controller 82 further removes noise components in the output of the accelerometer 44 using a low-pass filter (LPF) to obtain the accelerations ax, ay and az (step S14). Furthermore, the controller 82 calculates the inclination angle of the base 40 relative to the level ground based on the accelerations ax, ay and az (step S16). In particular, the controller 82 calculates a roll angle $\varphi b$ and a pitch angle $\theta b$ of the base 40 relative to the level ground while the utility task vehicle 10 is in the stationary state relative to the ground as follows:

$\varphi b = \arctan(ay/az)$; and $\theta b = -\arctan(ax/\sqrt{(ay^2 + az^2)})$.

In the illustrated embodiment, the roll angle φb of the base 40 is an inclination (rotation) angle of the base 40 about an X" axis that extends through the mount location of the accelerometer 44 on the base 40 and is parallel to a projection line of the longitudinal center line of the utility task vehicle 10 onto the level ground. Also, the pitch angle θb of the base 40 is an inclination (rotation) angle of the base 40 about a Y" axis that extends through the mount location of the accelerometer 44 and is parallel to a line that is perpendicular to the projection line of the longitudinal center line on the level ground.

Figure 8:
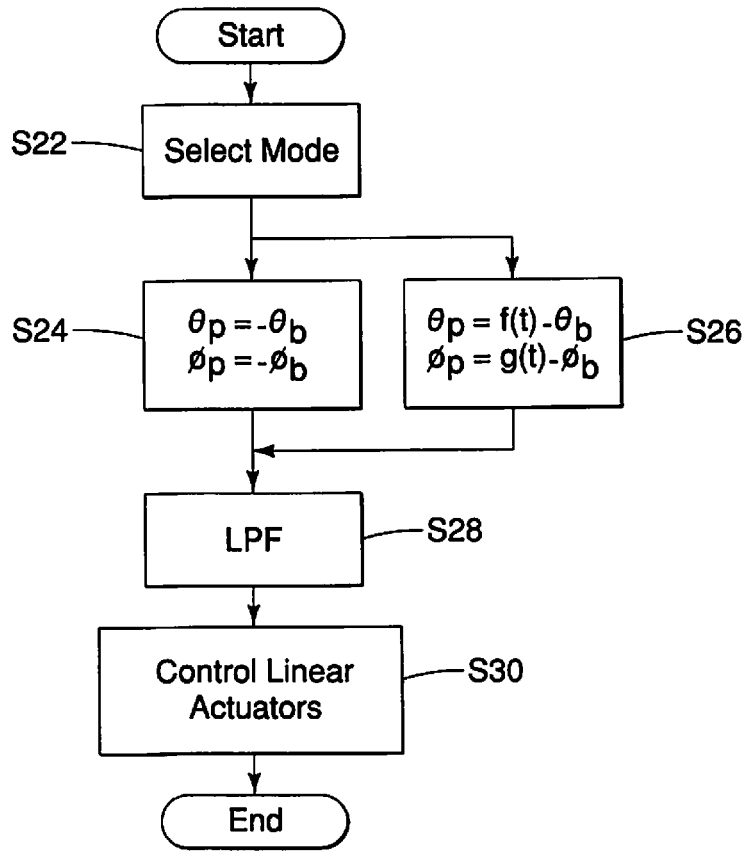
FIG. 8 is a flowchart for controlling the aircraft platform illustrated in FIG. 1.

Furthermore, as illustrated in FIG. 8, the controller 82 is programmed to control the linear actuators 48R and 48L to change the inclination of the landing pad 42. Specifically, the controller 82 first selects an operation mode of the aircraft platform 26 between a takeoff and landing mode and an INS (Inertial Navigation System) convergence assisting mode (step S22). In the illustrated embodiment, the operation mode of the aircraft platform 26 is manually selected by a user input.

The takeoff and landing mode of the aircraft platform 26 is a mode in which the controller 82 controls the linear actuators 48R and 48L to level the landing pad 42 based on the inclination angle of the base 40 as detected by the accelerometer 44. For example, in the takeoff and landing mode, the controller 82 levels the landing pad 42 for preparing the landing of the unmanned helicopter H while the unmanned helicopter H is not located on the landing pad 42. Of course, in the takeoff and landing mode, the controller 82 can also level the landing pad 42 for preparing the takeoff of the unmanned helicopter H while the unmanned helicopter H is located on the landing pad 42.

The INS convergence assisting mode of the aircraft platform 26 is a mode in which the controller 82 controls the linear actuators 48R and 48L to change the inclination of the landing pad 42 within a predetermined range based on the inclination angle of the base 40 as detected by the accelerometer 44. For example, in the INS convergence assisting mode, the controller 82 periodically changes the inclination of the landing pad 42 while the unmanned helicopter H is located on the landing pad 42.

When the takeoff and landing mode is selected in step S22, then the controller 82 calculates a target value of the roll angle (target roll angle φp) of the landing pad 42 relative to the base 40 and a target value of the pitch angle (target pitch angle θp) of the landing pad 42 relative to the base 40 as follows (step S24):

$$\theta p = -\theta b; \text{ and}$$

$$\varphi p = -\varphi b$$

where φb represents the roll angle of the base 40 relative to the level ground, and θb represents the pitch angle of the base 40 relative to the level ground.

On the other hand, when the INS convergence assisting mode is selected in step S22, then the controller 82 calculates the target roll angle φp of the landing pad 42 relative to the base 40 and the target pitch angle θp of the landing pad 42 relative to the base 40 as follows (step S26):

$$\theta p = f(t) - \theta b; \text{ and}$$

$$\varphi p = g(t) - \varphi b$$

where φb represents the roll angle of the base 40 relative to the level ground, and θb represents the pitch angle of the base 40 relative to the level ground.

The time functions f(t) and g(t) are expressed as follows:

$$f(t) = (2\pi/108) \times amp \times \sin(\omega t); \text{ and}$$

$$g(t) = (2\pi/180) \times amp \times \cos(\omega t)$$

where amp represents an amplitude (angle) of the periodic changes of the inclination of the landing pad 42, and t represents time (second). Also, ω represents an angular velocity, which is expressed as ω=2π/T where T represents the period (second) of the periodic motion of the landing pad 42. In the illustrated embodiment, the amplitude amp is set to 5 degrees, and the period T is set to 10 seconds, for example, which changes the target roll angle φp and the target pitch angle θp of the landing pad 42 within an angular range of ±5 degrees relative to the level ground.

The controller 82 further applies a low-pass filter (LPF) to the target roll angle φp and the target pitch angle θp that have been obtained in steps S24 and S26 to remove step changes upon switching the operation mode in step S22 (step S28). In the illustrated embodiment, the LPF has a time constant of 5 seconds, for example.

The controller 82 further controls the linear actuators 48R and 48L based on the target roll angle φp and the target pitch angle θp of the landing pad 42 (step S30).

Figure 9:
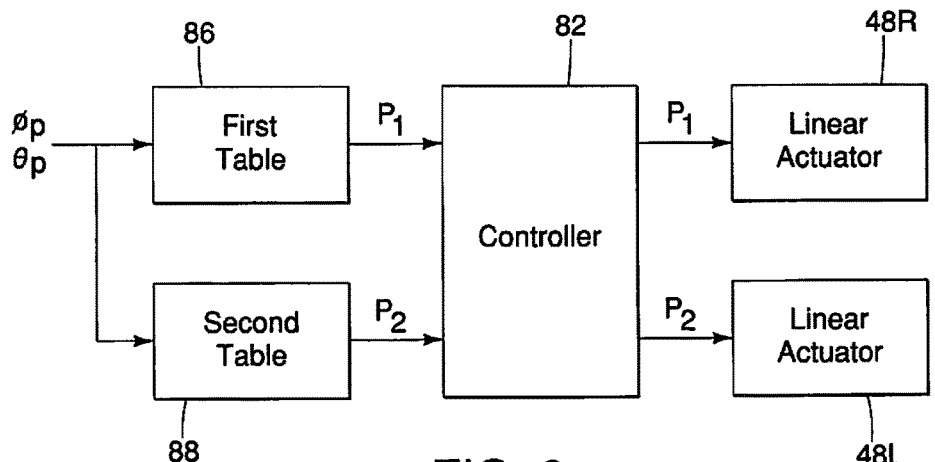
FIG. 9 is a schematic diagram illustrating a process for obtaining control amounts of the linear actuators.

As illustrated in FIG. 9, the controller 82 refers to the first and second tables 86 and 88 to obtain first and second target positions P1 and P2 of the linear actuators 48R and 48L (see FIG. 5) based on the target roll angle φp and the target pitch angle θp of the landing pad 42. Specifically, in the illustrated embodiment, the first table 86 includes a lookup table that stores a plurality of the first target positions P1 of the linear actuator 48R in association with a plurality of combinations of target roll angles φp and target pitch angles θp of the landing pad 42. Also, the second table 88 includes a lookup table that stores a plurality of the second target positions P2 of the linear actuator 48L in association with a plurality of combinations of target roll angles φp and target pitch angles θp of the landing pad 42. The first and second target positions P1 and P2 of the linear actuators 48R and 48L are calculated in advance so as to achieve the target roll angles φp and the target pitch angles θp of the landing pad 42, and are stored in the first and second tables 86 and 88, respectively, in association with the target roll angles φp and the target pitch angles θp. Specifically, the first and second target positions P1 and P2 are calculated in advance based on the distances between the joint locations L1, L2 and L3, the adjustable ranges of the linear actuators 48R and 48L, and the linearity of the linear actuators 48R and 48L.

As illustrated in FIG. 9, the controller 82 further controls the linear actuators 48R and 48L to adjust the linear actuators 48R and 48L to the first and second target positions P1 and P2, respectively. This operation changes an actual roll angle of the landing pad 42 and an actual pitch angle of the landing pad 42 to the target roll angle φp and the target pitch angle θp, respectively. Specifically, in the takeoff and landing mode, the actual roll angle and the actual pitch angle of the landing pad 42 is leveled relative to the level ground. Also, in the INS convergence assisting mode, the actual roll angle and the actual pitch angle of the landing pad 42 is changed within a predetermined angular range relative to the level ground.

In the illustrated embodiment, the utility task vehicle 10 has an elevated platform relative to the ground. Specifically, in the illustrated embodiment, the landing pad 42 is located even or above the top of the roll cage 14. Thus, it is prevented to generate dust and debris from the ground due to helicopter downwash of the unmanned helicopter H at takeoffs and landings of the unmanned helicopter H. Thus, it is prevented that the unmanned helicopter H is exposed to the dust and debris.

In the illustrated embodiment, the utility task vehicle 10 has the aircraft platform 26 with the landing pad 42. The aircraft platform control system 80 can adjust the inclination of the landing pad 42 using the linear actuators 48R and 48L. Specifically, in the takeoff and landing mode of the aircraft platform 26, the aircraft platform control system 80 can adjust the landing pad 42 to level the landing pad 42. Thus, even if the utility task vehicle 10 is used over an undulating or uneven fields, such as a vineyard, the landing pad 42 can be leveled, which is suitable for takeoff and landing of the unmanned helicopter H.

In the illustrated embodiment, in the INS convergence assisting mode, the controller 82 periodically changes the inclination of the landing pad 42 while the unmanned helicopter H is located on the landing pad 42. With this configuration, the INS convergence assisting mode of the aircraft platform 26 assists the alignment of an inertial navigation system (INS) of the unmanned helicopter H.

Figure 10:
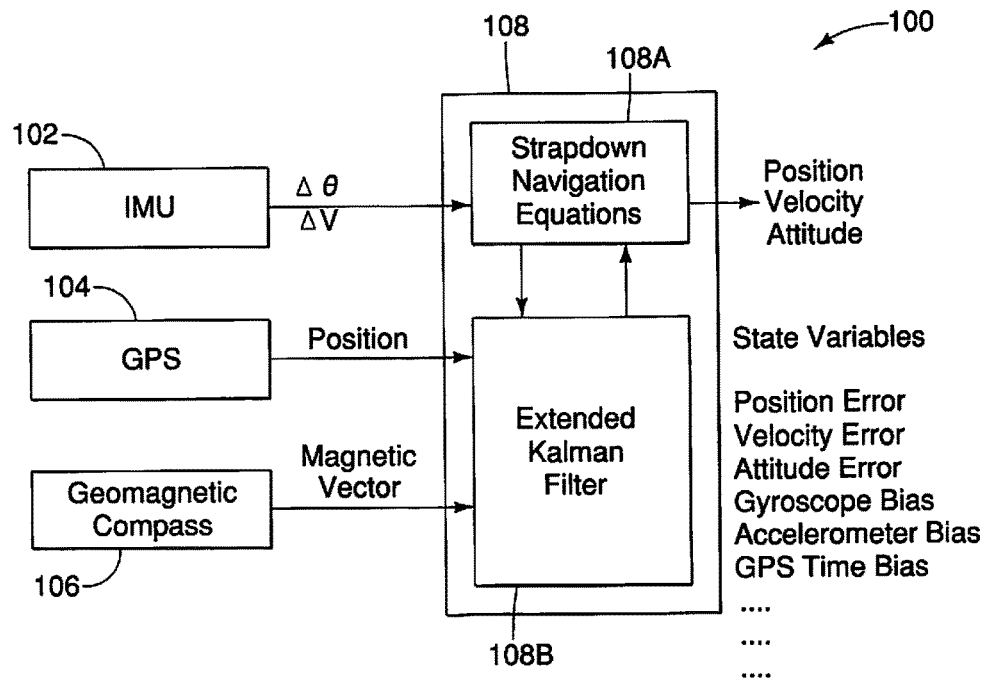
FIG. 10 is a block diagram of an inertial navigation system of the unmanned helicopter.

FIG. 10 illustrates an example of a GPS-aided-INS system 100 (hereinafter "GPS/INS system 100") of the unmanned helicopter H. As shown in FIG. 10, the GPS/INS system 100 includes an inertial measurement unit (IMU) 102, a GPS 104, a geomagnetic compass 106 and a processor 108. The GPS/INS system 100 estimates the position, the velocity and the attitude of the unmanned helicopter H based on the sensing results of the IMU 102, the GPS 104 and the geomagnetic compass 106. Specifically, the IMU 102 includes a gyroscope that detects the rotation (delta angle) $\Delta\theta$ of the unmanned helicopter H and an accelerometer that detects the delta velocity $\Delta V$ of the unmanned helicopter H. The GPS 104 detects the position of the unmanned helicopter H. The geomagnetic compass 106 detects the magnetic vector of the Earth's magnetic field.

The processor 108 basically calculates the position, the velocity and the attitude of the unmanned helicopter H using the strapdown navigation equations 108A based on the delta angle $\Delta\theta$ and the delta velocity $\Delta V$ as sensed by the IMU 102. The processor 108 also utilizes the extended Kalman filter 108B to estimate state variables for correcting errors in the calculation using the strapdown navigation equations 108A. Specifically, the processor 108 utilizes the extended Kalman filter 108B to estimate the position error, the velocity error, the attitude error, a gyroscope bias, an accelerometer bias, a GPS time bias, and the like, based on the output of the strapdown navigation equations 108A, the position detected by the GPS 104 and the magnetic vector detected by the geomagnetic compass 106. The GPS/INS system 100 is relatively conventional, and thus will not be discussed in detail herein.

Generally, it is important to obtain the gyroscope bias and the accelerometer bias of the GPS/INS system 100 as accurate as possible in order to accurately calculate the potion, the velocity and the attitude of the unmanned helicopter H. For example, the attitude of the unmanned helicopter H is calculated based on the integral of the delta angle $\Delta\theta$. Also, the position and the velocity of the unmanned helicopter H are further calculated based on the integral of the delta velocity $\Delta V$ that has been subjected to the coordinate transformation using the attitude of the unmanned helicopter H. Thus, the errors in the attitude, the position and the velocity will be caused by the errors in the gyroscope bias and the accelerometer bias.

While the unmanned helicopter H is in a stationary state relative to the ground, the gyroscope bias and the accelerometer bias of the GPS/INS system 100 cannot be determined upon starting the GPS/INS system 100. Of course, if the unmanned helicopter H uses an expensive IMU, such as Tactical grade, Navigation grade and the like, then the gyroscope bias and the accelerometer bias of the expensive IMU are enough small and stable to detect the rotation of the Earth (about 15 degrees/hour) from the output of the gyroscope. In this case, the output of the GPS/INS system 100 of the unmanned helicopter H can be kept accurate even when the unmanned helicopter H is in the stationary state relative to the ground.

However, in the illustrated embodiment, the unmanned helicopter H is basically used for industrial application, such as agricultural uses. In this case, the unmanned helicopter H preferably uses an inexpensive IMU, such as Commercial Grade, Automotive Grade and the like, as the IMU 102. Thus, the gyroscope bias and the accelerometer bias of the IMU 102 often fluctuate when the power is supplied to the GPS/INS system 100 or when the temperature of the IMU 102 changes. Furthermore, the gyroscope bias and the accelerometer bias of the IMU 102 are not enough stable to detect the rotation of the Earth. In this case, instead of using the rotation of the Earth as a reference of the direction, the output of the geomagnetic compass 106 is utilized as the reference of the direction. However, the geomagnetic compass 106 is greatly influenced by the surrounding environment, and it is difficult to accurately obtain the North direction due to the influence of the argument angle and dip angle. In particular, when there are magnetic powered objects around the takeoff and landing site, it becomes more difficult to accurately obtain the North direction. Therefore, it is difficult to accurately obtain the gyroscope bias and the accelerometer bias of the IMU 102 while the unmanned helicopter H is in the stationary state relative to the ground, and thus it is difficult to accurately calculate the potion, the velocity and the attitude of the unmanned helicopter H.

Instead of using the output of the geomagnetic compass 106 as the reference of the direction, the output of the GPS 104 can be used as the reference of the direction. In this case, the position obtained from the GPS 104 is not affected by the geomagnetism. Also, when RTK (Real Time Kinematic) GPS is used, then more accurate position can be obtained from the GPS 104. Thus, in this case, even if an inexpensive IMU is used as the IMU 102, it is possible to obtain accurate output from the GPS/INS system 100. However, even in this case, it is still difficult to accurately estimate all of the biases (e.g., the gyroscope bias and the accelerometer bias) of the IMU 102. Therefore, if the unmanned helicopter H is in the stationary state relative to the ground for a long time, the output from the GPS/INS system 100 tends to diverge. This divergence of the output from the GPS/INS system 100 happens not only when the unmanned helicopter H is in the stationary state relative to the ground after the power is supplied to the GPS/INS system 100 and before a subsequent takeoff of the unmanned helicopter H, but also when the unmanned helicopter H is in the stationary state relative to the ground after a landing of the unmanned helicopter H and before a subsequent takeoff of the unmanned helicopter H.

In particular, the accelerometer bias of the accelerometer on an X axis (a roll axis) of the unmanned helicopter H affects the calculation results of the pitch angle, the X axis position and the X axis velocity, while the gyroscope bias of the gyroscope on a Y axis (a pitch axis) of the unmanned helicopter H affects the calculation results of the pitch angle. However, while the unmanned helicopter H is in the stationary state relative to the ground, the attributable proportions of these biases relative to the calculation results cannot be determined. For example, when the processor 108 estimates the accelerometer bias and the gyroscope bias of the IMU 102 using the extended Kalman filter 108B based on the error in the X axis position caused by the accelerometer bias and the gyroscope bias of the IMU 102, the processor 108 cannot determine which of the biases need to be corrected and how much the biases need to be corrected while the unmanned helicopter H is in the stationary state relative to the ground.

On the other hand, in the illustrated embodiment, during the INS convergence assisting mode, the controller 82 periodically changes the inclination of the landing pad 42 while the unmanned helicopter H is located on the landing pad 42. Thus, the unmanned helicopter H is not stationary relative to the ground even when the unmanned helicopter H is located on the landing pad 42. Therefore, the processor 108 can accurately estimate the accelerometer bias and the gyroscope bias, which prevents the output of the GPS/INS system 100 from diverging.

Also, in the illustrated embodiment, the controller 82 periodically and evenly changes both the target roll angle φp and the target pitch angle θp of the landing pad 42 (step S26 in FIG. 8). Thus, regardless of the orientation of the unmanned helicopter H relative to the landing pad 42 (see FIGS. 3A, 3B, 4A and 4B, for example), the processor 108 can accurately estimate the accelerometer bias and the gyroscope bias. For example, when the output of the GPS/INS system 100 is calculated based on the strapdown navigation equations 108A, it is more effective for the convergence of the output of the GPS/INS system 100 if the unmanned helicopter H is moved in the direction along the Y axis of the unmanned helicopter H (i.e., if the Y axis acceleration is applied to the unmanned helicopter H). In the illustrated embodiment, since the controller 82 periodically and evenly changes both the target roll angle φp and the target pitch angle θp of the landing pad 42, the Y axis acceleration can be properly applied to the unmanned helicopter H regardless of the orientation of the unmanned helicopter H relative to the landing pad 42. Thus, the aircraft platform 26 can properly assist the convergence of the output of the GPS/UBS system 100.

The present invention is not limited the illustrated embodiments described above, and it is also possible to make various modifications.

In the illustrated embodiment, the controller 82 selects the operation mode of the aircraft platform 26 between the takeoff and landing mode and the INS convergence assisting mode. However, the present invention is not limited to this configuration. The controller 82 can only select one of the takeoff and landing mode and the INS convergence assisting mode.

In the illustrated embodiment, the operation mode of the aircraft platform 26 is manually selected by a user input. However, the present invention is not limited to this configuration. The operation mode of the aircraft platform 26 can be automatically selected by the controller 82.

For example, the controller 82 can monitor the engine speed of the unmanned helicopter H that is included in the downlink data of the wireless data link from the unmanned helicopter H. In this case, the controller 82 can automatically select the INS convergence assisting mode a predetermined time (10 seconds, for example) after determining that the engine speed has changed from a speed range of the normal flight to a speed rang of the idling. Furthermore, for example, the controller 82 can monitor the covariance data of the GPS/INS system 100 of the unmanned helicopter H.

In this case, the controller 82 can automatically select the INS convergence assisting mode upon determining that the covariance data becomes worse than a first threshold, while the controller 82 can automatically select the takeoff and landing mode upon determining that the covariance data becomes better than a second threshold. In this case, the first and second thresholds can be set such that the first and second thresholds have the hysteresis.

In the illustrated embodiment, the first and second target positions P1 and P2 of the linear actuators 48R and 48L are obtained based on the first and second tables 86 and 88. However, the present invention is not limited to this configuration. The controller 82 can compute the first and second target positions P1 and P2 of the linear actuators 48R and 48L based on the target roll angles φp and target pitch angles θp using predetermined formulas.

In the illustrated embodiment, the accelerometer 44 is mounted on the base 40. However, the present invention is not limited to this configuration. The accelerometer 44 can be mounted on the landing pad 42 to directly detect the inclination of the landing pad 42. In this case, the controller 82 controls the linear actuators 48R and 48L to level (for the takeoff and landing mode) or to periodically move (for the INS convergence assisting mode) the landing pad 42 based on the detected roll angles and the detected pitch angles of the landing pad 42.

In the illustrated embodiment, two linear actuators 48R and 48L are connected to the landing pad 42 to change the inclination of the landing pad 42. However, the present invention is not limited to this configuration. The aircraft platform 26 can only include one linear actuator or more than two linear actuators to change the inclination of the landing pad 42. In this case, the aircraft platform 26 can be configured such that only one of the support legs 46R, 46L and 46C is adjustable in height, or such that all of the support legs 46R, 46L and 46C is adjustable in height.

In the illustrated embodiment, the aircraft platform 26 has three support legs 46R, 46L and 46C. However, the present invention is not limited to this configuration. The aircraft platform 26 can have four or more support legs. Also, the aircraft platform 26 can have less than three support legs.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Unless otherwise defined, all terms (including technical and scientific terms) used herein have the same meaning as commonly understood by one of ordinary skill in the art to which illustrative embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Additionally, similar words used to describe the relationship between elements or layers should be interpreted in a like fashion (e.g., "between" versus "directly between", "above" versus "directly above", "below" versus "directly below", "adjacent" versus "directly adjacent," "on" versus "directly on"). Thus, components that are shown directly connected or contacting each other can have intermediate structures disposed between them unless specified otherwise.

Spatially relative terms, such as "forward", "rearward", "above", "below", "beneath", "downward", "vertical", "horizontal", and "transverse" as well as any other similar spatial terms may be used herein for the ease of description to describe one element or feature's relationship to another element(s) or feature(s) of the above embodiments. These terms, as utilized to describe the present invention should be interpreted relative to a utility task vehicle on a horizontal surface.

While only a selected embodiment has been chosen to illustrate the present invention, it will be apparent to those skilled in the art from this disclosure that various changes and modifications can be made herein without departing from the scope of the invention as defined in the appended claims. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An aircraft platform comprising:
   a base;
   a landing pad supported on the base;
   a level sensor configured to detect an inclination angle of at least one of the landing pad and the base with respect to a level ground;
   at least one actuator connected to change an inclination of the landing pad with respect to the base; and
   an electronic controller configured to select an operation mode of the aircraft platform between a first operation mode and a second operation mode while an aircraft is located on the landing pad,
   the electronic controller being configured to control the at least one actuator to level the landing pad in response to the first operation mode being selected, and
   the electronic controller being configured to control the at least one actuator to periodically change the inclination of the landing pad within a predetermined range with respect to the base such that the aircraft located on the landing pad continuously moves with the landing pad without stopping relative to a ground for an alignment of an inertial navigation system of the aircraft in response to the second operation mode being selected.

2. The aircraft platform according to claim 1, further comprising
   at least three support legs supporting the landing pad relative to the base,
   the at least one actuator including a plurality of actuators, and
   the at least three support legs including at least two support legs that are adjustable in height with the actuators and at least one support leg that is non-adjustable in height.

3. The aircraft platform according to claim 2, wherein the electronic controller is configured to control the actuators to level the landing pad based on the inclination angle as detected by the level sensor.

4. The aircraft platform according to claim 1, further comprising
   at least three support legs, at least one of the at least three support legs being adjustable in height with the at least one actuator.

5. The aircraft platform according to claim 4, wherein the at least one actuator includes a plurality of actuators, at least two support legs of the three support legs being adjustable in height with the actuators.

6. The aircraft platform according to claim 1, wherein the at least one actuator includes a plurality of actuators.

7. The aircraft platform according to claim 3, wherein the electronic controller is configured to level the landing pad while the aircraft is not located on the landing pad.

8. The aircraft platform according to claim 2, wherein the base includes a vehicle adapter.

9. A vehicle comprising the aircraft platform according to claim 1, and further comprising
   a base adapter configured to receive the base.

10. The vehicle according to claim 9, further comprising a refilling tank.

11. The vehicle according to claim 9, further comprising a roll cage, the landing pad being located even or above a top of the roll cage.

12. The aircraft platform according to claim 1, wherein the electronic controller is configured to control the at least one actuator to change periodically and evenly both roll and pitch angles of the landing pad in response to the second operation mode being selected.

* * * * *